US008433568B2

(12) United States Patent
Krause et al.

(10) Patent No.: US 8,433,568 B2
(45) Date of Patent: Apr. 30, 2013

(54) SYSTEMS AND METHODS FOR MEASURING SPEECH INTELLIGIBILITY

(75) Inventors: Lee Krause, Indialantie, FL (US); Mark Skowranski, Melbourne, FL (US); Bonny Banerjee, Palm Bay, FL (US)

(73) Assignee: Cochlear Limited (AU)

( * ) Notice: Subject to any disclaimer, the term of this patent is extended or adjusted under 35 U.S.C. 154(b) by 323 days.

(21) Appl. No.: 12/748,880

(22) Filed: Mar. 29, 2010

(65) Prior Publication Data

US 2010/0299148 A1 Nov. 25, 2010

Related U.S. Application Data

(60) Provisional application No. 61/164,454, filed on Mar. 29, 2009, provisional application No. 61/262,482, filed on Nov. 18, 2009.

(51) Int. Cl.
*G10L 15/00* (2006.01)

(52) U.S. Cl.
USPC ........... 704/237; 704/246; 704/247; 704/251; 704/252

(58) Field of Classification Search .................. 704/237, 704/246, 247, 251, 252
See application file for complete search history.

(56) References Cited

U.S. PATENT DOCUMENTS

| | | | | |
|---|---|---|---|---|
| 4,049,930 | A | 9/1977 | Fletcher et al. | |
| 4,327,252 | A | 4/1982 | Tomatis | |
| 5,008,942 | A | 4/1991 | Kikuchi | |
| 6,035,046 | A | 3/2000 | Cheng et al. | |
| 6,036,496 | A | 3/2000 | Miller et al. | |
| 6,118,877 | A | 9/2000 | Lindermann et al. | |
| 6,446,038 | B1 | 9/2002 | Bayya et al. | |
| 6,684,063 | B2 | 1/2004 | Berger et al. | |
| 6,763,329 | B2 | 7/2004 | Brandel et al. | |
| 6,823,171 | B1 | 11/2004 | Kaario | |
| 6,823,312 | B2 | 11/2004 | Mittal et al. | |
| 6,913,578 | B2 | 7/2005 | Hou | |
| 6,914,996 | B2 | 7/2005 | Takeda | |
| 7,206,416 | B2 | 4/2007 | Krause et al. | |
| 7,428,313 | B2 * | 9/2008 | Carney | 381/312 |
| 8,140,326 | B2 * | 3/2012 | Chen et al. | 704/226 |

(Continued)

FOREIGN PATENT DOCUMENTS

| | | |
|---|---|---|
| EP | 1519625 | 3/2005 |
| JP | 2002-291062 | 10/2002 |
| WO | WO 98/44762 | 10/1998 |
| WO | WO 2005/062776 | 7/2005 |

OTHER PUBLICATIONS

Chen, Jing et al., "Effect of Enhancement of Spectral Changes on Speech Intelligibility and Clarity Preferences for the Hearing Impaired", J. Acoust. Soc. Am. 131 (4), Apr. 2012, pp. 2987-2998.

(Continued)

*Primary Examiner* — Leonard Saint Cyr
(74) *Attorney, Agent, or Firm* — Merchant & Gould, P.C.

(57) ABSTRACT

A method for measuring speech intelligibility includes inputting a speech waveform to a system. At least one acoustic feature is extracted from the waveform. From the acoustic feature, at least one phoneme is segmented. At least one acoustic correlate measure is extracted from the at least one phoneme and at least one intelligibility measure is determined. The at least one acoustic correlate measure is mapped to the at least one intelligibility measure.

11 Claims, 5 Drawing Sheets

U.S. PATENT DOCUMENTS

| | | | | |
|---|---|---|---|---|
| 2002/0120440 | A1 | 8/2002 | Zhang | |
| 2003/0007647 | A1 | 1/2003 | Nielsen et al. | |
| 2005/0069162 | A1 * | 3/2005 | Haykin et al. | 381/312 |
| 2006/0126859 | A1 * | 6/2006 | Elberling | 381/71.1 |
| 2007/0286350 | A1 | 12/2007 | Krause et al. | |
| 2009/0304215 | A1 * | 12/2009 | Hansen | 381/317 |
| 2009/0306988 | A1 * | 12/2009 | Chen et al. | 704/261 |
| 2010/0027800 | A1 | 2/2010 | Banerjee et al. | |
| 2010/0299148 | A1 | 11/2010 | Krause et al. | |

OTHER PUBLICATIONS

IMS: IP Multimedia Subsystem, as described in 3GPP TS 23.228, "IP Multimedia Subsystem (IMS); Stage 2", V9.3.0, available at http://www.3gpp.org, 254 pgs., Mar. 2010.

Mannell, R., "Phonetics & Phonology topics: Distinctive Features", http://clas.mq.edu.au/speechlphonetics/phonology/featurcs/index.html (accessed Feb. 18, 2009), 23 pgs.

Rabiner, L., "A Tutorial on Hidden Markov Models and Selected Applications in Speech Recognition," Proc. IEEE, vol. 77, No. 2, pp. 257-286, Feb. 1989.

Runkle, P. et al., "Active Sensory Tuning for Immersive Specialized Audio", ICAD, 2000, 6 pgs.

SIP: Session Initiation Protocol, as described in Internet Engineering Task Force Request for Comments 3261 (IETF RFC 3261), "SIP: Session Initiation Protocol," available at http://www.ietf.org, 269 pgs., Jun. 2002.

Skowronski, et al., "Exploiting Independent Filter Bandwidth of Human Factor Cepstral Coefficients in Automatic Speech Recognition," J. Acoustical Society of America, vol. 116, No. 3, pp. 1774-1780, Sep. 2004.

Skowronski, M. D. et al., "Applied Principles of Clear and Lombard Speech for Intelligibility Enhancement in Noisy Environments," Speech Communication, vol. 48, No. 5, pp. 549-558, May 2006.

* cited by examiner

SYSTEMS AND METHODS FOR MEASURING SPEECH INTELLIGIBILITY

CROSS-REFERENCE TO RELATED APPLICATIONS

This application claims the benefit of U.S. Provisional Patent Application No. 61/164,454, filed Mar. 29, 2009, and U.S. Provisional Patent Application No. 61/262,482, filed Nov. 18, 2009, the disclosures of which are hereby incorporated by reference herein in their entireties.

FIELD OF THE INVENTION

The invention relates to measuring speech intelligibility, and more specifically, to measuring speech intelligibility using acoustic correlates of distinctive features.

BACKGROUND

Distinctive features of speech are the fundamental characteristics that make each phoneme in all the languages of the world unique, and are described in Jakobson, R., C. G. M. Fant, and M. Halle, PRELIMINARIES TO SPEECH ANALYSIS: THE DISTINCTIVE FEATURES AND THEIR CORRELATES (MIT Press, Cambridge, Mass.; 1961) (hereinafter "Jakobson et al."), the disclosure of which is hereby incorporated by reference herein in its entirety. They function to discriminate each phoneme from all others and as such are traditionally identified by the binary extremes of each feature's range. Jakobson et al. defined twelve features that fully discriminate the world's phonemes: 1) vocalic/non-vocalic, 2) consonantal/non-consonantal, 3) compact/diffuse, 4) grave/acute, 5) flat/plain, 6) nasal/oral, 7) tense/lax, 8) continuous/interrupted, 9) strident/mellow, 10) checked/unchecked, 11) voiced/unvoiced, and 12) sharp/plain.

Distinctive features are phonological, developed primarily to express in a simple manner the rules of a language for combining phonetic segments into meaningful words, and are described in Mannell, R., Phonetics & Phonology topics: Distinctive Features, http://clas.mq.edu.au/speech/phonetics/phonology/featurcs/index.html (accessed Feb. 18, 2009) (hereinafter "Mannell"), the disclosure of which is hereby incorporated by reference herein in its entirety. However, distinctive features are manifest in spoken language through acoustic correlates. For example, "compact" denotes a clustering of formants, while "diffuse" denotes a wide range of formant frequencies of a phoneme. All twelve distinctive features may be expressed in terms of acoustic correlates, as described in Jakobson et al., which are measurable from speech waveforms. Jakobson et al. suggest measures for acoustic correlates; however, such measures are neither unique nor optimal in any sense, and many measures exist which may be used as acoustic correlates of distinctive features.

Distinctive features, through acoustic correlates, are naturally related to speech intelligibility, because a change in distinctive feature (e.g., tense to lax) results in a change in phoneme (e.g., /p/ to /b/) which produces different words when used in the same context (e.g., "pat" and "bat" are distinct English words). Highly intelligible speech contains phonemes that are easily recognized (quantified variously by listener cognitive load or noise robustness) and exhibits acoustic correlates that are highly separable. Conversely, speech of low intelligibility contains phonemes that are easily confused with others and exhibits acoustic correlates that are not highly separable. Therefore, the separability of acoustic correlates of distinctive features is a measure of the intelligibility of speech. Separation of acoustic correlates of distinctive features may be measured in several ways. Distinctive features naturally separate into binary classes, so classification methods may be used to map acoustic correlates to speech intelligibility. Binary classes, however, do not produce sufficient differentiation between the distinctive features. What is needed, then, is a method that measure speech intelligibility with higher resolution than the known binary classes.

SUMMARY OF THE INVENTION

In one aspect, the invention relates to a method for measuring speech intelligibility, the method including the steps of inputting a speech waveform, extracting at least one acoustic feature from the waveform, segmenting at least one phoneme from the at least one first acoustic feature, extracting at least one acoustic correlate measure from the at least one phoneme, determining at least one intelligibility measure, and mapping the at least one acoustic correlate measure to the at least one intelligibility measure. In an embodiment, the speech waveform is input from a talker. In another embodiment, the speech waveform is based at least in part on a stimulus sent to the talker. In another embodiment, the at least one acoustic feature is extracted utilizing a frame-based procedure. In yet another embodiment, the at least one acoustic correlate measure is extracted utilizing a segment-based procedure. In still another embodiment, the at least one intelligibility measure includes a vector.

In an embodiment of the above aspect, the vector expresses the acoustic correlate measure in a non-binary value. In another embodiment, the non-binary value has a value in a range from −1 to +1. In another embodiment, the non-binary value has a value in a range from 0% to 100%.

In another aspect, the invention relates to an article of manufacture having computer-readable program portions embedded thereon for measuring speech intelligibility, the program portions including instructions for inputting a speech waveform from a talker, instructions for extracting at least one acoustic feature from the waveform, instructions for segmenting at least one phoneme from the at least one first acoustic feature, instructions for extracting at least one acoustic correlate measure from the at least one phoneme, instructions for determining at least one intelligibility measure, and instructions for mapping the at least one acoustic correlate measure to the at least one intelligibility measure.

In another aspect, the invention relates to a system for measuring speech intelligibility, the system including a receiver for receiving a speech waveform from a talker, a first extractor for extracting at least one acoustic feature from the waveform, a first processor for segmenting at least one phoneme from the at least one first acoustic feature, a second extractor for extracting at least one acoustic correlate measure from the at least one phoneme, a second processor for determining at least one intelligibility measure, and a mapping module for mapping the at least one acoustic correlate measure to the at least one intelligibility measure. In an embodiment, the system includes a system processor including the first extractor, the first processor, the second extractor, the second processor, and the mapping module.

In another aspect, the invention relates to a method of measuring speech intelligibility, the method including the step of utilizing a non-binary value to characterize a distinctive feature of speech. In another aspect, the invention is related to a speech analysis system utilizing the above-recited method. In another aspect, the invention is related to a speech rehabilitation system utilizing the above-recited method.

In another aspect, the invention relates to a method of tuning a hearing device, the method including the steps of sending a stimulus to a hearing device associated with a user, receiving a user response, wherein the user response is based at least in part on the stimulus, measuring an intelligibility value of the user response, comparing the stimulus to the intelligibility value, determining an error associated with the comparison, and adjusting at least one parameter of the hearing device based at least in part on the error. In an embodiment, the user response includes a distinctive feature of speech. In another embodiment, the error is determined based at least in part on a non-binary value characterization of the distinctive feature of speech. In yet another embodiment, the error is determined based at least in part on a binary value characterization of the distinctive feature of speech. In still another embodiment, the adjustment is based at least in part on a prior knowledge of a relationship between the intelligibility value and a parameter of the hearing device.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1A:
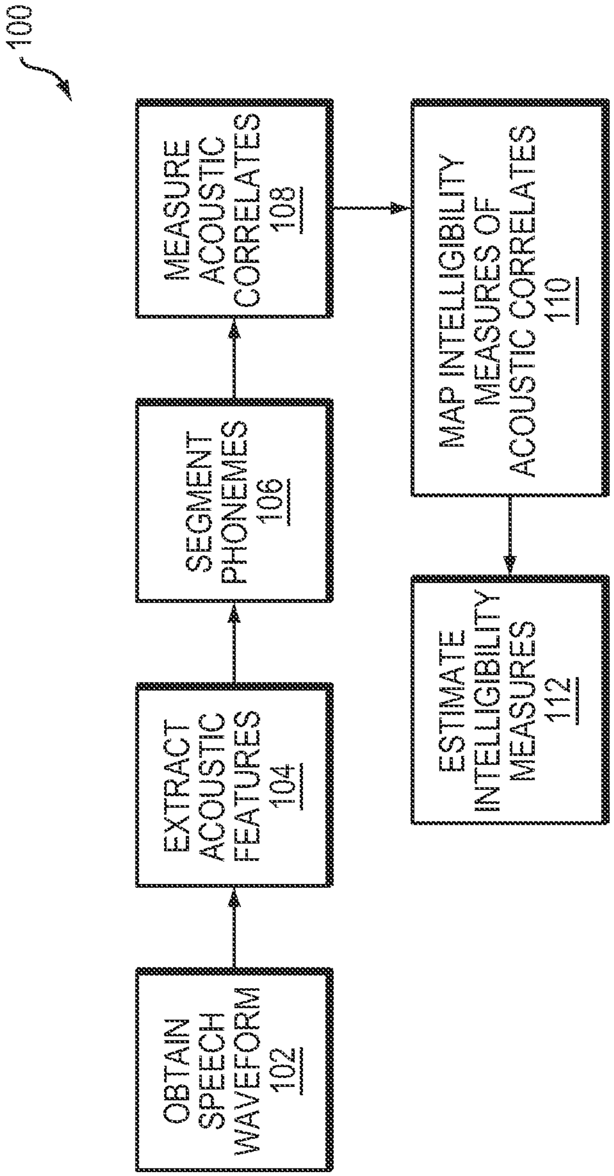
FIG. 1A is a schematic diagram of method for measuring speech intelligibility using acoustic correlates of distinctive features in accordance with one embodiment of the present invention.

FIG. 1A depicts a method 100 for measuring speech intelligibility using acoustic correlates of distinctive features. The method 100 begins by obtaining a speech waveform from a subject (Step 102). This waveform is input into an acoustic feature extraction process, where the acoustic features are extracted (Step 104) using a frame-based extraction. The acoustic features are input into a segmentation routine that segments or delimits phoneme boundaries (Step 106) in the speech waveform. Segmentation may be performed using a hidden Markov model (HMM), as described in Rabiner, L., "A Tutorial on Hidden Markov Models and Selected Applications in Speech Recognition," Proc. IEEE, vol. 77, no. 2, pp. 257-286, February 1989 (hereinafter "Rabiner"), the disclosure of which is hereby incorporated by reference herein in its entirety. Additionally, any automatic speech recognition (ASR) engine may be employed.

The HMM may be trained as phoneme models, bi-phone models, N-phone models, syllable models or word models. A Viterbi path of the speech waveform through the HMM may be used for segmentation, so the phonemic representation of each state in the HMM is required. Phonemic representation of each state may utilize hand-labeling phoneme boundaries for the HMM training data. Specific states are assigned to specific phonemes (more than one state may be used to represent each phoneme for all types of HMMs).

Because segmentation is performed using an ASR engine, the acoustic feature extraction process may be a conventional ASR front end. Human factor cepstral coefficients (HFCCs) a spectral flatness measure, a voice bar measure (e.g., energy between 200 and 400 Hz), and delta and delta-delta coefficients as acoustic features may be utilized. HFCCs and delta and delta-delta coefficients are described in Skowronski, M. D. and J. G. Harris, "Exploiting independent filter bandwidth of human factor cepstral coefficients in automatic speech recognition," J. Acoustical Society of America, vol. 116, no. 3, pp. 1774-1780, September 2004 (hereinafter "Skowronski et al. 2004"), the disclosure of which is hereby incorporated by reference herein in its entirety. Spectral flatness measure is described in Skowronski, M. D. and J. G. Harris, "Applied principles of clear and Lombard speech for intelligibility enhancement in noisy environments," Speech Communication, vol. 48, no. 5, pp. 549-558, May 2006 (hereinafter "Skowronski et al. 2006"), the disclosure of which is hereby incorporated by reference herein in its entirety. Acoustic features may be measured for each analysis frame (20 ms duration), with uniform overlap (10 ms) between adjacent frames. Analysis frames and overlaps having other durations and times are contemplated.

Acoustic correlates for each phoneme of the speech waveform are then measured from segmented regions (Step 108). The correlates may include HFCC calculated over a single window spanning the entire region of a phoneme (which may be much longer than 20 ms), a single voice bar measure, and/or a single spectral flatness measure, augmented with several other acoustic correlates. Various other acoustic correlates may be appended to the set of correlates listed above that provide additional information targeting specific distinctive features of phonemes. Jakobson et al. suggest several measures including, but not limited to, main-lobe width of an autocorrelation function of the acoustic waveform in the segmented region, ratio of low-frequency to high-frequency energy, ratio of energy at the beginning and end of the segment, ratio of maximum to minimum spectral density (calculated variously by direct spectral measurement or from any spectral envelope estimate such as that from linear prediction), the spectral second moment, plosive burst duration, ratio of plosive burst energy to overall phoneme energy, and formant frequency and bandwidth estimates.

The acoustic correlates for each phoneme are then mapped to the intelligibility measures by a mapper function (Step 110). The intelligibility measures may comprise a vector of values (one for each distinctive feature) that quantifies the degree to which each distinctive feature is expressed in the acoustic correlates for each phoneme, ranging from 0% to 100%. For example, a phoneme with more low-frequency energy than high-frequency energy will produce an intelligibility measure for the distinctive feature grave/acute close to 100%, while a phoneme dominated by noise-like properties will produce an intelligibility measure for strident/mellow close to 100%. Phonemes may be coarticulated, so the acoustic correlates of neighboring phonemes may be included as input to the mapper function in producing the intelligibility measure for the central phoneme of interest.

The mapper function maps the input space (acoustic correlates) to the output space (intelligibility measures). No language in the world requires all twelve distinctive features to identify each phoneme of that language, so the size of the output space various with each language. For English, the first nine distinctive features listed above are sufficient to identify each phoneme. Thus, the output space of the mapper function for English phonemes contains nine dimensions. The mapper function may be any linear or nonlinear method for combining the acoustic correlates to produce intelligibility measures. Because the output space is of limited range and the intelligibility measures may be used to discriminate phonemes, the mapper function may be implemented with a feed-forward artificial neural network (ANN). Sigmoid activation functions may be utilized in the output layer of the ANN to ensure a limited range of the output space. The particular architecture of the ANN (number and size of each network layer) may vary by application. In certain embodiments, three layers may be utilized. It is generally desirable for the input layer to be the same size as the input space and for the output layer to be the same size as the output space. At least one hidden layer may ensure that the ANN may approximate any nonlinear function. The mapper function may be trained using the same speech data used to train the HMM segmenter. The output of the ANN may be trained using binary target values for each distinctive feature.

The intelligibility measure us then estimated (Step 112), using a one or more processes. In one embodiment, the intelligibility measure is estimated from acoustic correlates using a neural network mapping function, the measured values are referred to as continuous-valued distinctive features (CVDFs). CVDFs are in the range of about −1 to about +1. In certain embodiments, CVDFs are in the range of −1 to +1 and may be converted to percentages by the equation:

$$100 \cdot \frac{1 + CVDF}{2}$$

CVDFs may be transformed for normality considerations by using the inverse of the neural network output activation function, producing inverse CVDFs (iCVDFs):

$$iCVDF = -\log\left(\frac{2}{1 + CVDF} - 1\right)$$

In another embodiment, the intelligibility measure may be estimated as a probability using likelihood models for the positive and negative groups of each distinctive feature. The distribution of acoustic correlates may be modeled using an appropriate likelihood model (e.g., mixture of Gaussians). To train a pair of models for a distinctive feature, the available speech database is divided into two groups, one for all phonemes with a positive value for the distinctive feature and one for all phonemes with a negative value for the distinctive feature. Acoustic correlates are extracted and used to train a statistical model for each group. To use the models, the acoustic correlates of a speech input are extracted, then the likelihoods from each pair of models for each distinctive feature are calculated. The likelihoods for a distinctive feature are combined using Bayes' Rule to produce a probability that the speech input exhibits the positive and negative value of the distinctive feature. Distinctive feature a priori probabilities may be included in Bayes' Rule based on feature distributions of the target language (e.g., English contains only three nasal phonemes while the rest are oral). When the intelligibility measure is estimated from acoustic correlates using a statistical model, the measured values are referred to as distinctive feature probabilities (DFPs).

Figure 1B:
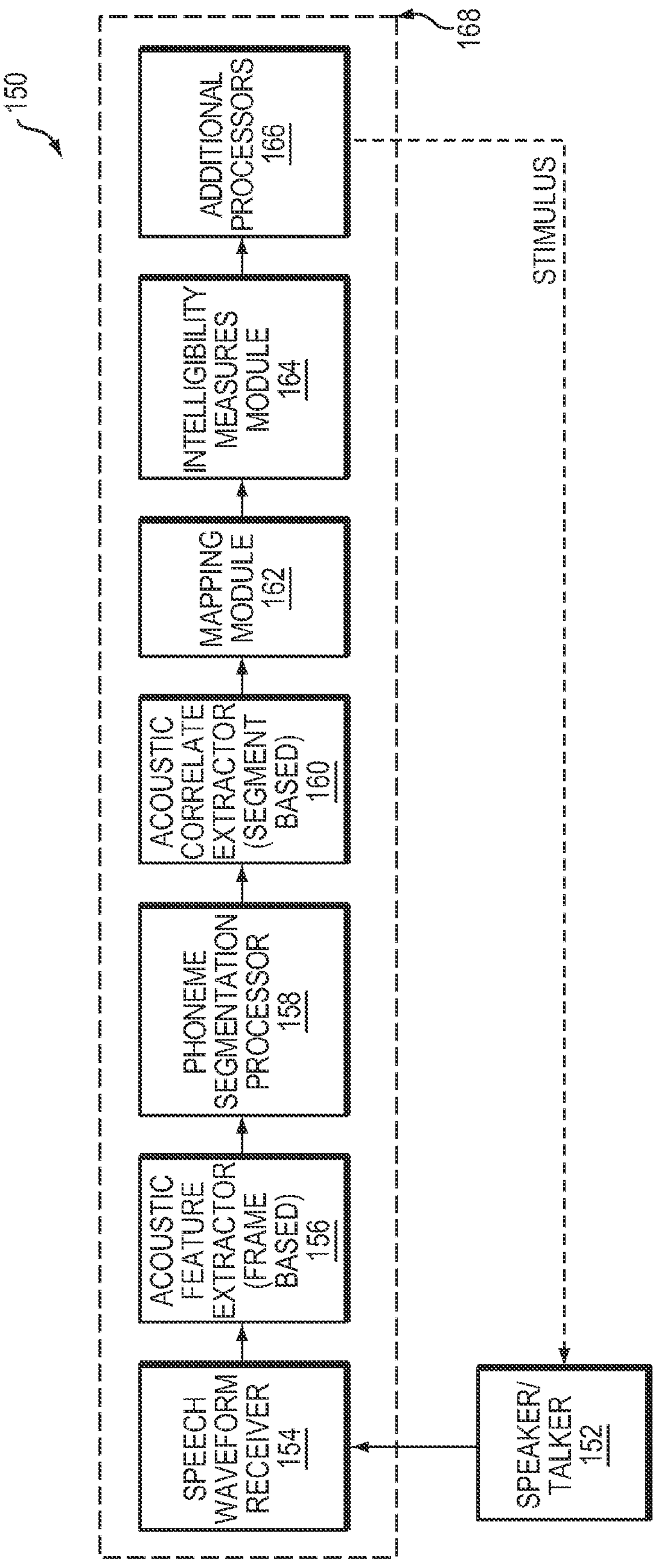
FIG. 1B is a schematic diagram of a system for measuring speech intelligibility using acoustic correlates of distinctive features in accordance with one embodiment of the present invention.

FIG. 1B depicts one embodiment of a system 150 for measuring speech intelligibility using acoustic correlates of distinctive features in accordance with one embodiment of the present invention. This system 150 may perform the method depicted in FIG. 1A and may be incorporated into specific applications, as described herein. The system 150 measures the speech intelligibility of a speaker or talker 152. The talker 152 speaks into a microphone (which may be part of a stand-alone tuning system or incorporated into a personal computer), that delivers the speech waveform to a receiver 154. An acoustic feature extractor 156 performs a frame-based extraction (as described with regard to FIG. 1A). The resulting phoneme segments are then delivered to a processor 158. Next, segment-based acoustic correlate extraction is performed by an extractor module 160. These acoustic correlates are then mapped by a mapping module 162 with the intelligibility measures. The intelligibility measures may be stored in a separate module 164, which may be updated as testing progressing by the mapping module 162. The system may include additional processors or modules 166, for example, a stimuli generation module for sending new test stimuli to the talker 152. In one embodiment of the system, each of the components are contained within a single system processor 168.

The proposed intelligibility measure quantifies the distinctiveness of speech and is useful in many applications. One series of applications uses the change in the proposed intelligibility measure to quantify the change in speech from a talker due to a treatment. The talker may be undergoing speech or auditory therapy, and the intelligibility measure may be used to quantify progress. A related application is to quantify the changes in speech due to changes in the parameters of a hearing instrument then use that knowledge to fit a hearing device (i.e., hearing aids, cochlear implants) to a patient, as described below.

Hearing devices are endowed with tunable parameters so that the devices may be customized to compensate for an individual's hearing loss. The hearing device modifies the acoustic properties of sounds incident to an individual to enhance the perception of the characteristics of the sounds for the purposes of detection and recognition. One method for tuning hearing device parameters includes using a stimulus/response test paradigm to access the effects of a hearing device parameter set on the perception of speech for an individual hearing device user. Thereafter, each stimulus/response pair are compared to estimate a difference in speech properties. The method then converts the differences in speech properties of the stimulus/response pairs to a change in the device parameter set using prior knowledge of the relationship between device parameters and speech properties.

Figure 2A:
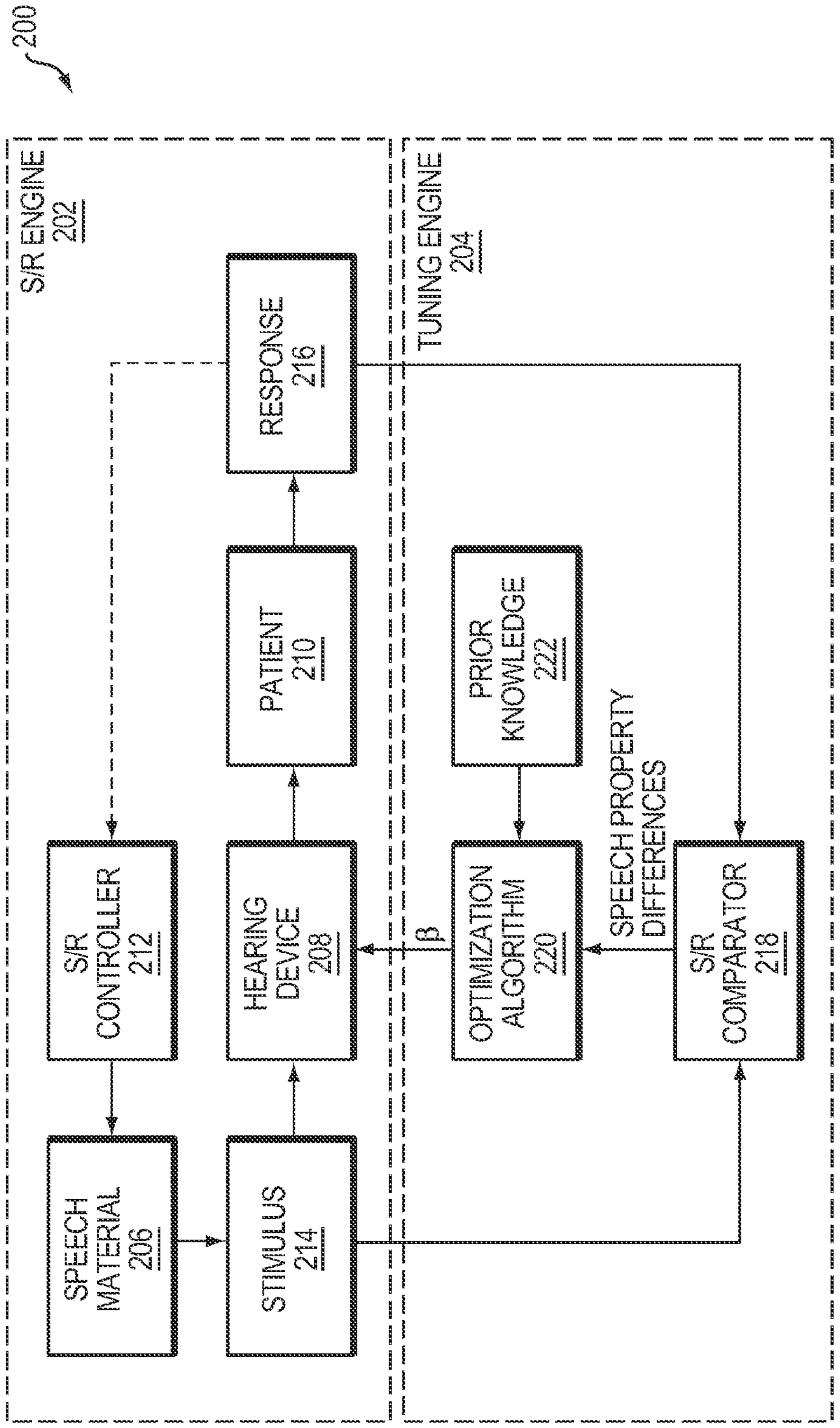
FIG. 2A is a schematic diagram of a system for tuning a hearing device in accordance with one embodiment of the present invention.

FIG. 2A depicts a system 200 for tuning a hearing device. The system 200 includes a the stimulus/response (S/R) engine 202, and a tuning engine 204. The S/R engine 202 includes speech material 206, a hearing device 208, a patient 210, and a control mechanism 212 for administering a speech stimulus to a patient (using a hearing device) and recording an elicited response 216. Each stimulus 214 is paired with the elicited response 216, and the speech material 206 is designed to allow easy comparison of the S/R pairs. The tuning engine 204 includes an S/R comparator 218, an optimization algorithm 220, and an embodiment of prior knowledge 222 of the relationship between hearing device parameters β and speech properties.

In a proposed method of testing using the system 200 of FIG. 2, the speech material 206 is presented to a patient 210 by the S/R controller 212, which controls the number of presentations in a test, the presentation order of the speech material 206, and the level of any masking noise which affects the difficulty of the test. After each test, the S/R pairs are analyzed by the tuning engine 204 to produce a new parameter set β for the next test. The process may iterate for one or more tests in a session. The goal of the process is to incrementally decrease errors in S/R pair comparisons for each test. The parameter set producing the lowest error in S/R pair comparisons is considered the optimal parameter set of the session. Still, less-optimal sets may still be utilized to improve or adjust the perceptual ability of the patient, even if these adjustments are not considered "optimal" or "perfect."

In certain embodiments of the system and method, isolated vowel-consonant-vowel (VCV) nonsense words may be used as the speech material 206 with variation in the consonant (e.g., /aba/, /ada/, /afa/). Isolated VCV stimulus words are easy to compare with responses, producing primarily substitution errors of the consonant (e.g., /aba/ recognized as /apa/). The initial and final vowels provide context for the consonant phonemes. The fact that the words are nonsensical significantly reduces the influence of language on the responses (i.e., prevents a patient from guessing at the correct response).

The S/R comparator 218 uses distinctive features (DFs) of speech, as described in Jakobson et al., to compare the stimulus 214 and response 216 for each pair. DFs are binary subunits of phonemes that uniquely encode each phoneme in a language. For example, the English language is described by a set of nine DFs: {vocalic, consonantal, compact, grave, flat, nasal, tense, continuant, strident}. Other phonological theories, such as those presented in Chomsky, N. and Halle, M., THE SOUNDS PATTERN OF ENGLISH (Harper and Row, New York; 1968), present alternative DF sets, any of which are appropriate for S/R comparison. The disclosure of Chomsky is hereby incorporated by reference herein in its entirety. The DFs of the S/R pairs are compared to produce an error:

$$E_t(f)=F(E_{t,+}(f),E_{t,-}(f),N)$$

where $E_t(f)$ is the error for feature f in test $t^t$, $E_{t,+}(f)$ is the number of stimuli with a positive DF for feature $f^f$ that were recognized as responses with a non-positive DF for feature $f^f$, $E_{t,-}(f)$ is the number of stimuli with a negative DF for feature $f^f$ that were recognized as responses with a non-negative DF for feature f, and $N^N$ is the number of S/R pairs in a test.

The errors $E_{t,+}(f)$ and $E_{t,-}(f)$ may also be tabulated from continuous-valued distinctive features (CVDFs), as described above with regard to FIGS. 1A and 1B. The function F(·) converts $E_{t,+}(f)$ and $E_{t,-}(f)$ to a single error term for each feature that is independent of N. One such function is:

$$F(E_{t,+}(f), E_{t,-}(f), N) = \frac{E_{t,+}(f) - E_{t,-}(f)}{N}.$$

Other functions F(·) may be utilized, such as those that incorporate prior knowledge of the distributions of $E_{t,+}(f)$ and $E_{t,-}(f)$ for random S/R pairs. The function F(·) may also include importance weights based on the distributions of DFs in the language of the stimuli.

Hearing devices typically have many tunable parameters (some have more than 100 tunable parameters), which makes optimizing each parameter independently a challenge due to the combinatorially large number of possible parameter sets. To circumvent the difficulties of optimization in a large parameter space, a low-dimensional model of independent parameters may be imposed onto the set of hearing device parameters such that the hearing device parameters (or a subset of hearing device parameters) are derived from the low-dimensional model.

One low-dimensional model that may be employed is bump-tilt-gain (BTG) that uses five parameters: {bump gain, bump quality, bump center frequency, tilt slope, overall gain}. BTG, in one instance, describes a filter that distributes energy across frequency which affects spectral cues and, consequently, speech intelligibility. It is desirable for the hearing device 208 to include the capability of implementing BTG.

The prior knowledge 222 represents the relationship between speech properties and tunable device or device model parameters. The relationship is determined prior to a patient's tuning session, based on either expert knowledge or experiments measuring the effects of tunable parameters on speech. Prior knowledge of the relationship between DFs and BTG parameters may be presented in a master table, where each row represents a unique parameter set β and each column represents the effect of β on each DF, averaged over all utterances of the speech material in a speech database. For example, the baseline parameter set $\beta_0$ (zero bump gain and zero tilt slope) has no effect on DFs, while a different parameter set with nonzero bump gain and/or tilt slope may cause speech to become more grave, more compact, and less nasal compared to $\beta_0$.

To help quantify the magnitude of change in DFs in the master table, CVDFs may be used for finer resolution of distinctive features. Because CVDFs are not normally distributed, they may be transformed CVDFs to inverse CVDFs (iCVDFs):

$$iCVDF = -\log\left(\frac{2}{1 + CVDF} - 1\right)$$

Inverse CVDFs are more normally distributed, which facilitates averaging over all utterances of speech material in a speech database. For greater statistical power, ΔiCVDF for each utterance is measured as the difference in iCVDFs between β and $\beta_0$. The master table was filled by averaging ΔiCVDFs over all utterances:

$$K_\beta(f) = \frac{1}{W}\sum_{w=1}^{W} \Delta iCVDF_{\beta,w}(f)$$

where $\Delta iCVDF_{\beta,w}(f)$ is the ΔiCVDF for distinctive feature f, parameter set $\beta^\beta$, word $w^w$ out of $W^W$ total words in the speech database, and $K_\beta(f)$ is the master table entry for feature f, parameter set $\beta^\beta$.

Prior knowledge of the relationship between DFs and BTG parameter sets may be in other forms besides a master table. The master table is used by the optimization algorithm (described below) in a non-parametric classifier (nearest neighbor), but a parametric classifier may also be used which requires the prior knowledge to be in the form of model parameters learned from utterances of speech material in a speech database.

The optimization algorithm 220 combines the measured error in speech properties with prior knowledge to produce a new parameter set for the next test. Using errors in DFs, $E_t(f)$, and prior knowledge in the form of master table entries $K_\beta(f)$, the parameter set for test t+1, $\beta_{t+1}$, is determined as follows:

$$\beta_{t+1} = \arg\min_{\forall\beta} \sum_f ((\delta(f) \cdot E_t(f) + K_{\beta_t}(f)) - K_\beta(f))^2$$

where $\delta(f)$ is the step size for feature f, $E_t(f)$ is the error from test t for feature f, $K_{\beta_t}(f)$ is the master table entry for parameter set $\beta_t$ for feature $f^f$, and $K_\beta(f)$ is the master table entry for parameter set β for feature f.

The errors $E_t(f)$ are scaled by step size $\delta(f)$ then combined with the current master table entry $K_{\beta_t}(f)$ as an offset. The offset entry is then compared with all master table entries, and β of the closest entry in a mean-squared sense is returned. The step size parameter $\delta(f)$ performs several functions. For example, it normalizes the variances between $E_t(f)$ and $K_\beta(f)$, controls the step size of movement in ΔiCVDF space, and weights the importance of each feature.

Figure 2B:
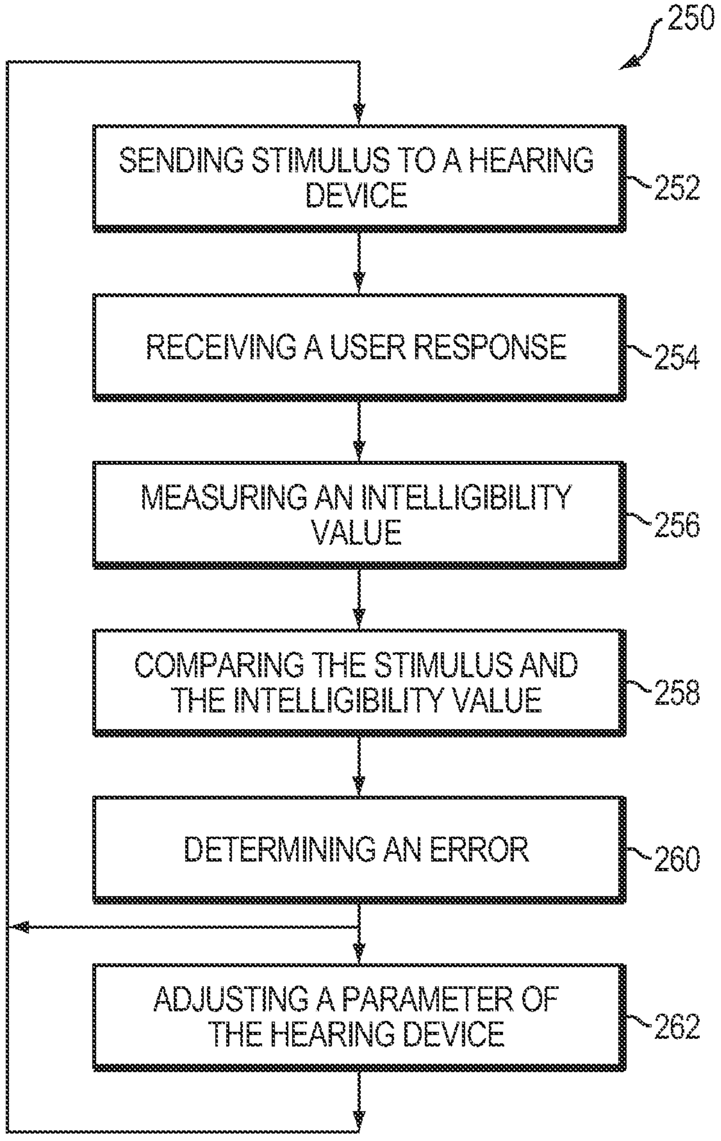
FIG. 2B is a schematic diagram of method for tuning a hearing device in accordance with one embodiment of the present invention.

FIG. 2B is a schematic diagram of method 250 for tuning a hearing device. First, a stimulus is sent to a hearing device that is associated with a user (Step 252). In Step 254, a response from the user is then received (either via a microphone, keyboard, etc., as described with regard to FIG. 3). The intelligibility value is then measured (Step 256) in accordance with the processes described above. Thereafter, the stimulus and intelligibility value are compared (Step 258) and an error is determined (Step 260). After the error is determined, another stimulus may be send to the hearing device. This process may be repeated until the testing procedure is competed, at which time, one or more parameters of the hearing device may be adjusted (Step 262). Alternatively, parameters of the hearing device may be adjusted prior to any new stimulus being sent to the hearing device.

In the applications described above in FIGS. 2A and 2B, the method 100 of FIG. 1B uses a stimulus/response strategy to determine the distinctive feature weaknesses of a hearing-impaired patient then applies the knowledge of the relationship between changes to hearing instrument parameters and changes in the intelligibility measure to adjust the hearing instrument parameters to compensate for the expressed distinctive feature weaknesses. Another similar application is the evaluation of the effects of a speech processing method (e.g., speech codec, enhancement method, noise-reduction method) on the intelligibility of speech.

Another application of the intelligibility measure is to evaluate the distinctiveness of speech material used in listening tests and psychoacoustic evaluations. Performance on such tests varies due to several factors, and the proposed intelligibility measure may be used to explain part of the variation in performance due to speech material distinctiveness variation. The intelligibility measure may also be used to screen speech material for such tests to ensure uniform distinctiveness.

Figure 3:
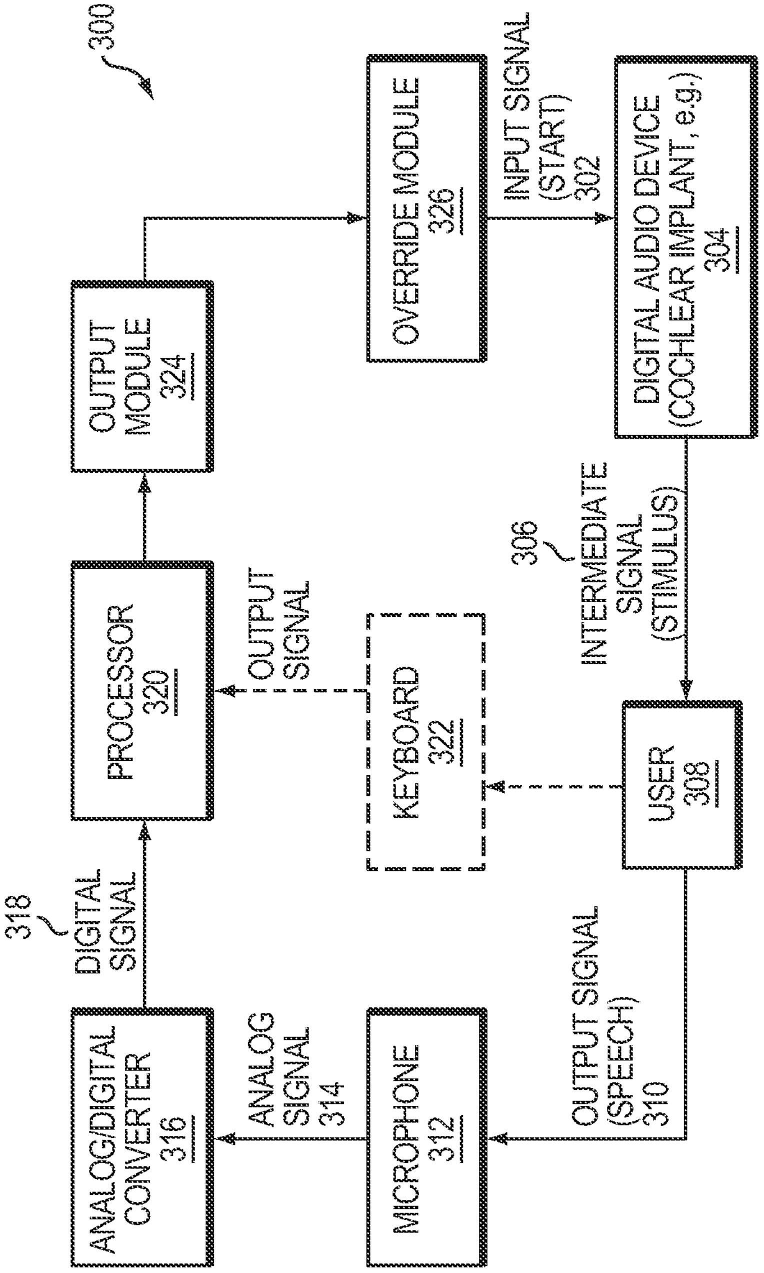
FIG. 3 is a schematic diagram of a testing system in accordance with one embodiment of the present invention.

The testing methods and systems may be performed on a computer testing system 300 such as that depicted in FIG. 3. In a stimulus/response test, such as that depicted with regard to FIG. 2A, an input signal 302 is generated and sent to a digital audio device, which, in this example, is a cochlear implant (CI) 304. Based on the input signal, the CI will deliver an intermediate signal or stimulus 306, associated with one or more parameters, to a user 308. At the beginning of a test procedure, the parameters may be factory-default settings. At later points during a test, the parameters may be otherwise defined. In either case, the test procedure utilizes the stored parameter values to define the stimulus (i.e., the sound).

After a signal is presented, the user is given enough time to make a sound signal representing what he heard. The output signal corresponding to each input signal is recorded. The output signal 310 may be a sound repeated by the user 308 into a microphone 312. The resulting analog signal 314 is converted by an analog/digital converter 316 into a digital signal 318 delivered to the processor 320. Alternatively, the user 308 may type a textual representation of the sound heard into a keyboard 322. In the processor 320, the output signal 310 is stored and compared to the immediately preceding stimulus.

The S/R comparator (FIG. 2A) compares the stimulus and response and utilizes the optimization algorithm to adjust the hearing device. Additionally, the algorithm suggests a value for the next test parameter, effectively choosing the next input sound signal to be presented. Alternatively, the S/R controller may choose the next sound. This new value is delivered via the output module 324. If an audiologist is administering the test, the audiologist may choose to ignore the suggested value, in favor of their own suggested value. In such a case, the tester's value would be entered into the override module 326. Whether the suggested value or the tester's override value is utilized, this value is stored in a memory for later use (likely in the next test).

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

In the embodiments described above, the software may be configured to run on any computer or workstation such as a PC or PC-compatible machine, an Apple Macintosh, a Sun workstation, etc. In general, any device can be used as long as it is able to perform all of the functions and capabilities described herein. The particular type of computer or workstation is not central to the invention, nor is the configuration, location, or design of a database, which may be flat-file, relational, or object-oriented, and may include one or more physical and/or logical components.

The servers may include a network interface continuously connected to the network, and thus support numerous geographically dispersed users and applications. In a typical implementation, the network interface and the other internal components of the servers intercommunicate over a main bi-directional bus. The main sequence of instructions effectuating the functions of the invention and facilitating interaction among clients, servers and a network, can reside on a mass-storage device (such as a hard disk or optical storage unit) as well as in a main system memory during operation. Execution of these instructions and effectuation of the functions of the invention is accomplished by a central-processing unit ("CPU").

A group of functional modules that control the operation of the CPU and effectuate the operations of the invention as described above can be located in system memory (on the server or on a separate machine, as desired). An operating system directs the execution of low-level, basic system functions such as memory allocation, file management, and operation of mass storage devices. At a higher level, a control block, implemented as a series of stored instructions, responds to client-originated access requests by retrieving the user-specific profile and applying the one or more rules as described above.

Communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client and the connection between the client and the server can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims, and all equivalents.

What is claimed is:

1. A method for measuring speech intelligibility, the method comprising the steps of:

inputting a speech waveform;

extracting at least one acoustic feature from the waveform;

segmenting at least one phoneme from the at least one first acoustic feature;

extracting at least one acoustic correlate measure from the at least one phoneme;

determining at least one intelligibility measure, wherein the determination is based upon a language; and mapping the at least one acoustic correlate measure to the at least one intelligibility measure, wherein mapping comprises a vector of at least one value that correspond to the at least one intelligibility measure, the at least one value corresponding to a degree to which the at least one intelligibility measure corresponds to the at least one phoneme.

2. The method of claim 1, wherein the speech waveform is input from a talker.

3. The method of claim 1, wherein the speech waveform is based at least in part on a stimulus sent to the talker.

4. The method of claim 1, wherein the at least one acoustic feature is extracted utilizing a frame-based procedure.

5. The method of claim 1, wherein the at least one acoustic correlate measure is extracted utilizing a segment-based procedure.

6. The method of claim 1, wherein the vector expresses the acoustic correlate measure in a non-binary value.

7. The method of claim 6, wherein the non-binary value comprises a value in a range from −1 to +1.

8. The method of claim 6, wherein the non-binary value comprises a value in a range from 0% to 100%.

9. An article of manufacture having a memory comprising computer-readable instructions that, when executed by a processor, perform a method of measuring speech intelligibility, the method comprising:

inputting a speech waveform from a talker;

extracting at least one acoustic feature from the waveform;

segmenting at least one phoneme from the at least one first acoustic feature;

extracting at least one acoustic correlate measure from the at least one phoneme;

determining at least one intelligibility measure, wherein the determination is based upon a language; and mapping the at least one acoustic correlate measure to the at least one intelligibility measure, wherein mapping comprises a vector of at least one value that correspond to the at least one intelligibility measure, the at least one value corresponding to a degree to which the at least one intelligibility measure corresponds to the at least one phoneme.

10. A system for measuring speech intelligibility, the system comprising:

a receiver for receiving a speech waveform from a talker;

a first extractor for extracting at least one acoustic feature from the waveform;

a first processor for segmenting at least one phoneme from the at least one first acoustic feature;

a second extractor for extracting at least one acoustic correlate measure from the at least one phoneme;

a second processor for determining at least one intelligibility measure, wherein the determination is based upon a language; and a mapping module for mapping the at least one acoustic correlate measure to the at least one intelligibility measure, wherein mapping comprises a vector of at least one value that correspond to the at least one intelligibility measure, the at least one value corresponding to a degree to which the at least one intelligibility measure corresponds to the at least one phoneme.

11. The system of claim 10, further comprising a system processor comprising the first extractor, the first processor, the second extractor, the second processor, and the mapping module.

* * * * *